J. RIOTH.
Harrow.
No. 164,484.
Patented June 15, 1875.
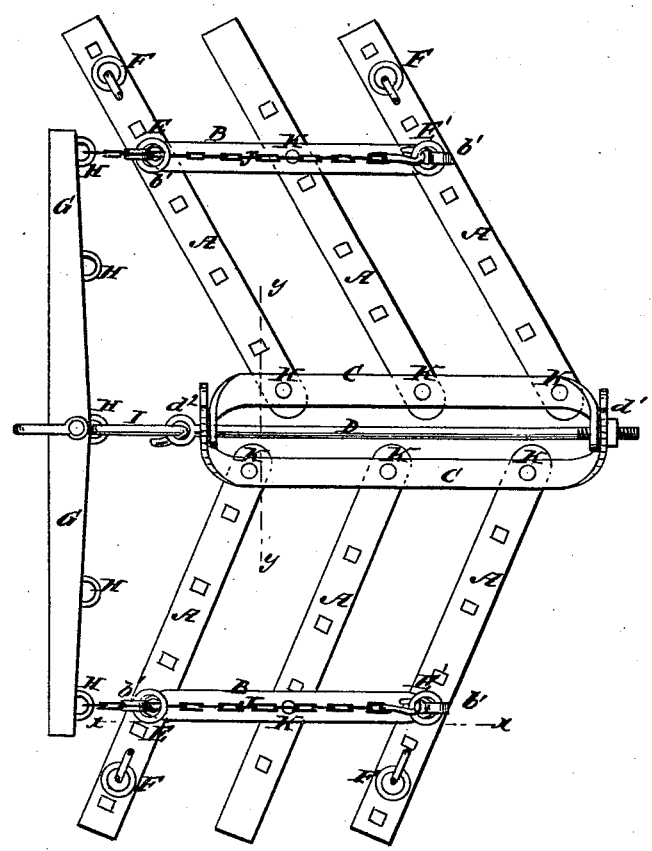
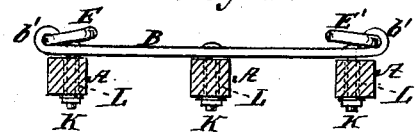
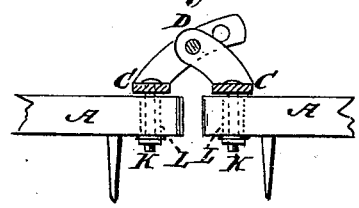
WITNESSES:
INVENTOR:
Joseph Rioth
BY
ATTORNEYS.

UNITED STATES PATENT OFFICE.

JOSEPH RIOTH, OF MOUNT STERLING, ILLINOIS.

IMPROVEMENT IN HARROWS.

Specification forming part of Letters Patent No. 164,484, dated June 15, 1875; application filed May 8, 1875.

*To all whom it may concern:*

Be it known that I, JOSEPH RIOTH, of Mount Sterling, in the county of Brown and State of Illinois, have invented a new and useful Improvement in Harrow, of which the following is a specification:

Figure 1 is a top view of my improved harrow. Fig. 2 is a detail section of the same, taken through the line $x\ x$, Fig. 1. Fig. 3 is a detail cross-section of the coupling, taken through the line $y\ y$, Fig. 1.

Similar letters of reference indicate corresponding parts.

The object of this invention is to furnish an improved harrow which shall be so constructed that it may be readily adjusted to adapt it to the various kinds of harrowing required, and which shall be simple in construction and effective in operation.

The invention consists in an improved harrow, formed by the combination, with each other, of the two sets of parallel bars, the two connecting-bars, the two connecting and coupling bars, the coupling-rod, the two sets of rings, the draft-bar provided with five staples or eyebolts, the draft-rod, and the two draft-chains, as hereinafter fully described.

The harrow-frame is made in two parts. Each part consists of three or more parallel bars, A, connected toward their outer ends by a cross-bar, B, and at their inner ends by a bar, C. The bolts K, that secure the bars B C to the bars A, pass through metallic bushes L, inserted in holes in the bars A, to prevent the said bars A from being worn by the said bolts K. The ends of the bars C are bent upward and outward, so that the adjacent ends may overlap. The overlapped ends of the bars C have one or more holes formed through them, to receive a long bolt or rod, D, so that the two parts may be adjusted closer together or farther apart, as may be desired. The rod D has a nut, $d^1$, screwed upon one end, and an eye, $d^2$, formed upon its other end. The ends of the bars B have eyes $b'$ formed upon them to receive the rings E. The outer ends of the outer bars A of each part or wing have rings F secured to them by staples or eyebolts. G is the draft-bar, to the center of which the draft is applied, and to the rear side of which are attached five staples or eyebolts, H. To the central staple H is attached a rod, I, which has a hook formed upon its other end to hook into the eye $d^2$ of the rod D. J are two draft-chains, the forward ends of which are hooked into two of the staples H, equally distant from the center of the draft-bar G. The chains J are passed through the forward rings E, and are hooked into the rear rings E', or into the forward rings F, or are turned back upon themselves and hooked into their own links; or the chains J may be passed through the forward rings F, and secured in any of the ways hereinbefore indicated.

By reversing the rod D the draft may be applied to the other side of the harrow. The rings F also serve as handles for convenience in raising either part or wing of the harrow.

By detaching the chains J the parts of the harrow may be folded together, so that it may be drawn upon its side in passing to and from the field, and from place to place.

Having thus described my invention, I claim as new and desire to secure by Letters Patent—

An improved harrow, formed by the combination, with each other, of the two sets of parallel bars A, the connecting-bars B, the connecting and coupling bars C, the coupling-rod D, the two sets of rings E E' F, the draft-bar G, provided with five staples or eyebolts, H, the draft-rod I, and the two draft-chains J, substantially as herein shown and described.

JOSEPH RIOTH.

Witnesses:
JNO. J. McDANNOLD,
NELSON LOVIETT.